(12) United States Patent
Oka

(10) Patent No.: US 10,826,066 B2
(45) Date of Patent: Nov. 3, 2020

(54) LITHIUM-ION SECONDARY BATTERY

(71) Applicant: TOYOTA JIDOSHA KABUSHIKI KAISHA, Toyota (JP)

(72) Inventor: Hideaki Oka, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 2 days.

(21) Appl. No.: 16/351,649

(22) Filed: Mar. 13, 2019

(65) Prior Publication Data
US 2019/0296358 A1 Sep. 26, 2019

(30) Foreign Application Priority Data

Mar. 23, 2018 (JP) .................. 2018-055859
Sep. 14, 2018 (JP) .................. 2018-172132

(51) Int. Cl.
| | |
|---|---|
| *H01M 4/133* | (2010.01) |
| *H01M 4/36* | (2006.01) |
| *H01M 4/13* | (2010.01) |
| *H01M 4/62* | (2006.01) |
| *H01M 10/056* | (2010.01) |
| *H01M 10/0525* | (2010.01) |
| *H01M 10/0568* | (2010.01) |
| *H01M 4/587* | (2010.01) |
| *H01M 10/0569* | (2010.01) |

(52) U.S. Cl.
CPC ............. *H01M 4/62* (2013.01); *H01M 4/366* (2013.01); *H01M 4/587* (2013.01); *H01M 10/0525* (2013.01); *H01M 10/0568* (2013.01); *H01M 10/0569* (2013.01)

(58) Field of Classification Search
CPC ......... H01M 10/0525; H01M 10/0568; H01M 10/0569; H01M 4/366; H01M 4/587; H01M 4/62
See application file for complete search history.

(56) References Cited

U.S. PATENT DOCUMENTS

2017/0141397 A1  5/2017  Lecuyer et al.

FOREIGN PATENT DOCUMENTS

| JP | 2010-244911 A | 10/2010 |
| JP | 2010244911 A | * 10/2010 |
| JP | 2017-526109 A | 9/2017 |

* cited by examiner

*Primary Examiner* — Basia A Ridley
*Assistant Examiner* — Heng M. Chan
(74) *Attorney, Agent, or Firm* — Sughrue Mion, PLLC

(57) ABSTRACT

A lithium-ion secondary battery includes at least a positive electrode and a negative electrode. The negative electrode is porous. The negative electrode includes a carbon fiber aggregate and a polymer film. The carbon fiber aggregate is an aggregate of a plurality of carbon fibers bound together in a three-dimensional fashion. The polymer film covers a surface of each of the carbon fibers. The positive electrode includes a group of particles and an electrolyte solution. The group of particles is dispersed in the electrolyte solution. The group of particles contains a positive electrode active material and a conductive material. Pores that are present within the negative electrode are filled with the positive electrode. The polymer film is swollen with the electrolyte solution.

5 Claims, 6 Drawing Sheets

LITHIUM-ION SECONDARY BATTERY

This nonprovisional application is based on Japanese Patent Application No. 2018-055859 filed on Mar. 23, 2018, and No. 2018-172132 filed on Sep. 14, 2018, with the Japan Patent Office, the entire contents of which are hereby incorporated by reference.

BACKGROUND

Field

The present disclosure relates to a lithium-ion secondary battery.

Description of the Background Art

Japanese Patent Laying-Open No. 2010-244911 discloses forming an electrode cell by covering a carbon-fiber nonwoven fabric with an electrolyte membrane, filling pores within the nonwoven fabric with a positive electrode active material and a solvent, and evaporating the solvent.

SUMMARY

Japanese Patent Laying-Open No. 2010-244911 states that the electrode cell having this configuration is adopted to rapid charge-discharge. The reason is considered that the facing area per unit volume is large. The facing area refers to the area of an interface where the positive electrode faces the negative electrode.

In Japanese Patent Laying-Open No. 2010-244911, the process of forming this electrode cell uses a particle dispersion. The particle dispersion is obtained by dispersing the positive electrode active material (particles) in the solvent. The resulting particle dispersion is put into pores that are present within the carbon-fiber nonwoven fabric to fill the pores, and then the particle dispersion is dried. It is considered that the dried carbon-fiber nonwoven fabric has pores the total volume of which is equivalent to the volume once occupied by the solvent. Because of the presence of the pores, the volumetric energy density (energy per unit volume) decreases. In other words, it is considered that the electrode cell disclosed in Japanese Patent Laying-Open No. 2010-244911 has room for improvement in the volumetric energy density.

An object of the present disclosure is to improve volumetric energy density.

In the following, the technical structure and the effects according to the present disclosure are described. It should be noted that part of the action mechanism according to the present disclosure is based on presumption. Therefore, the scope of claims should not be limited by whether or not the action mechanism is correct.

[1] A lithium-ion secondary battery according to the present disclosure includes at least a positive electrode and a negative electrode. The negative electrode is porous. The negative electrode includes a carbon fiber aggregate and a polymer film. The carbon fiber aggregate is an aggregate of a plurality of carbon fibers bound together in a three-dimensional fashion. The polymer film covers a surface of each of the carbon fibers. The positive electrode includes a group of particles and an electrolyte solution. The group of particles is dispersed in the electrolyte solution. The group of particles contains a positive electrode active material and a conductive material. Pores that are present within the negative electrode are filled with the positive electrode. The polymer film is swollen with the electrolyte solution.

The positive electrode of the lithium-ion secondary battery according to the present disclosure (this lithium-ion secondary battery may be simply referred to as "battery" hereinafter) is liquid. More specifically, the positive electrode includes the group of particles (including the positive electrode active material) and the electrolyte solution. The group of particles is dispersed in the electrolyte solution.

The negative electrode includes the carbon fiber aggregate and the polymer film. The carbon fiber aggregate consists of a plurality of carbon fibers. On each of the carbon fibers, intercalation reaction of lithium (Li) ions can occur. In other words, the carbon fibers serve as a negative electrode active material. Between the carbon fibers, pores are present. In other words, the negative electrode is porous. The pores present within the negative electrode are filled with the positive electrode. The positive electrode is liquid and therefore it is considered that the positive electrode is capable of filling the pores within the negative electrode without leaving any space. Therefore, this configuration is considered capable of inhibiting any unfilled space from being present within the battery. In other words, this configuration is expected to have an improved volumetric energy density.

The polymer film is swollen with the electrolyte solution contained in the positive electrode. The polymer film before being swollen may be thinner than the swollen polymer film. Because the polymer film before being swollen is thin, it is considered that there is a great volume of pores available to be filled with the positive electrode. As a result, filling the pores with the positive electrode (liquid) is expected to be easy.

In the configuration in which the polymer film is swollen, the volume of the positive electrode is decreased but the content of the positive electrode active material in the positive electrode remains the same. This means that the volumetric energy density of the positive electrode increases. Therefore, an improvement in the volumetric energy density is expected to be obtained.

In the battery according to the present disclosure, the electrolyte solution serves as an ionic conduction path between the positive electrode active material and the negative electrode active material. Therefore, movement of Li ions in this configuration is considered smooth. As a result, the battery according to the present disclosure is expected to have a high power.

[2] The electrolyte solution contains at least a solvent and a lithium (Li) salt. The solvent may contain an ether.

Typically as a solvent in an electrolyte solution, a carbonate ester (such as ethylene carbonate (EC) and ethyl methyl carbonate (EMC)) is used. In the configuration in which an ether (such as 1,2-dimethoxyethane (DME)) is used as the solvent, an improvement in electrical conductivity is expected to be obtained. The reason is considered that an ether has a low viscosity and promotes dissociation of a Li salt. The improvement in the electrical conductivity of the electrolyte solution is expected to lead to a decrease in resistance.

In lithium primary batteries, use of an ether as a solvent of an electrolyte solution is already carried out. In lithium-ion secondary batteries, on the other hand, use of an ether as a solvent of an electrolyte solution has not been widely carried out. The reason is considered that if an ether is present in a lithium-ion secondary battery, co-insertion of the ether occurs. In a typical lithium-ion secondary battery, the negative electrode active material is graphite. A crystal of graphite consists of a plurality of carbon hexagonal net planes stacked on top of one another. In the electrolyte solution, Li ions are solvated with molecules of the solvent (the ether). The term "co-insertion" refers to a phenomenon in which solvent molecules coordinated to Li ions are inserted, along with the Li ions, into the gaps between the carbon hexagonal net planes. When co-insertion occurs, breakdown of the solvent molecules occurs within the gaps between the carbon hexagonal net planes, causing detachment of the carbon hexagonal net planes from each other and subsequent collapse of the crystal structure. It is considered that the collapse of the crystal structure leads to a decrease in the number of sites into which Li ions can be inserted. As a result, the capacity is considered decreased.

In the lithium-ion secondary battery according to the present disclosure, the carbon fibers serve as the negative electrode active material. The present disclosure has discovered that the configuration in which carbon fibers are used as the negative electrode active material and an ether is used as a solvent can have an increased capacity; in other words, this configuration is expected to have an improved volumetric energy density. The detailed mechanism of this phenomenon is unclear at this point, but one potential mechanism is as follows: the crystallinity of the carbon fibers is lower than that of graphite and therefore the crystal structure is less likely to collapse upon co-insertion (if occurs). Another potential mechanism is as follows: during initial charge, co-insertion of the ether (if occurs) can moderately disrupt the regularity in the surface structure of the carbon fibers and thereby make the Li-ion diffusion path within the carbon fibers expand. These potential mechanisms can be responsible for the increase in capacity.

[3] In the configuration according to [2] above, the solvent may contain at least one selected from the group consisting of 1,4-dioxane (DX) and 1,2-dimethoxyethane (DME).

[4] In the configuration according to [2] or [3] above, the lithium salt may contain a lithium imide salt. The lithium imide salt is a salt composed of a lithium ion and a fluorine-containing sulfonyl imide anion.

Typically as a Li salt (a salt serving as a supporting electrolyte) in an electrolyte solution, LiPF$_6$ is used. As the Li salt, a lithium (Li) imide salt is also researched. A Li imide salt is a salt composed of a Li ion and a fluorine-containing sulfonyl imide anion. The "fluorine-containing sulfonyl imide anion" refers to a sulfonyl imide anion containing a fluorine atom. An electrolyte solution containing a Li imide salt may have a high electrical conductivity. The reason is considered that the Li imide salt may be highly dissociable. In addition, this highly dissociable characteristic of the Li imide salt is expected to decrease resistance factors (such as resistance against movement of electric charges) within the positive electrode. These two effects of the Li imide salt are expected to synergistically lead to a decrease in resistance.

It should be noted that the Li imide salt corrodes aluminum (Al), which is a disadvantage of the Li imide salt. Typically, a positive electrode of a lithium-ion secondary battery includes a positive electrode current collector. The positive electrode current collector is a conductive electrode substrate. A typical positive electrode current collector is an Al foil sheet. When the positive electrode current collector corrodes, resistance can increase.

In the lithium-ion secondary battery according to the present disclosure, the positive electrode is liquid. The positive electrode according to the present disclosure does not require an electrode substrate (more specifically, an Al foil sheet). Therefore, it is considered that a decrease in resistance (namely, an advantage of the Li imide salt) can be obtained without being accompanied by corrosion of Al (namely, a disadvantage of the Li imide salt).

[5] In the configuration according to [4] above, the lithium salt may contain lithium bis(fluorosulfonyl)imide. More specifically, the Li imide salt may be lithium bis(fluorosulfonyl)imide. Hereinafter, lithium bis(fluorosulfonyl)imide may be simply referred to as "LiFSI".

[6] In the configurations according to [2] to [5] above, the carbon fibers may contain polyacrylonitrile(PAN)-based carbon fibers.

Although the detailed mechanism is unclear, it is considered that PAN-based carbon fibers have a very high affinity for an ether. Therefore, the configuration in which the carbon fibers (negative electrode active material) contain PAN-based carbon fibers is expected to have an increased capacity and a decreased polarization. As a result, an improvement in volumetric energy density is expected to be obtained.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

In the following, embodiments according to the present disclosure (herein called "present embodiment") are described. The scope of claims is not limited to the description below.

<Lithium-Ion Secondary Battery>

Figure 1:
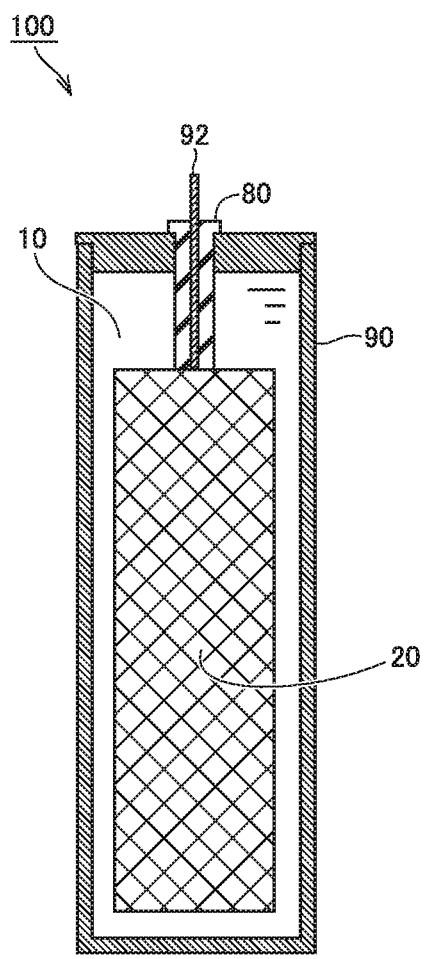
FIG. 1 is a conceptual view illustrating the structure of the lithium-ion secondary battery according to the present embodiment.

FIG. 1 is a conceptual view illustrating the structure of the lithium-ion secondary battery according to the present embodiment.

A battery 100 is a lithium-ion secondary battery. Battery 100 includes a casing 90. Casing 90 may have any outer profile. The outer profile of casing 90 may be cylindrical or prismatic, for example. Casing 90 may be made of stainless steel (SUS) and/or aluminum (Al) alloy, for example. Casing 90 may be, for example, a pouch made of an aluminum-laminated film. In the configuration in which an electrolyte solution 12 (described below) contains a Li imide salt, however, it is desirable that the part of casing 90 that is to come into contact with electrolyte solution 12 contain no Al. Casing 90 accommodates a positive electrode 10 and a negative electrode 20. In other words, battery 100 includes at least positive electrode 10 and negative electrode 20.

Positive electrode 10 is liquid. Positive electrode 10 is in contact with an interior wall of casing 90. Casing 90 if made of a conductive material can serve as a positive electrode terminal. To negative electrode 20, a negative electrode terminal 92 is electrically connected. Negative electrode terminal 92 may be made of nickel (Ni), for example. An electrical insulating material 80 electrically insulates negative electrode terminal 92 from both positive electrode 10 and casing 90. Electrical insulating material 80 may be made of a fluororesin, for example.

<<Negative Electrode>>

Figure 2:
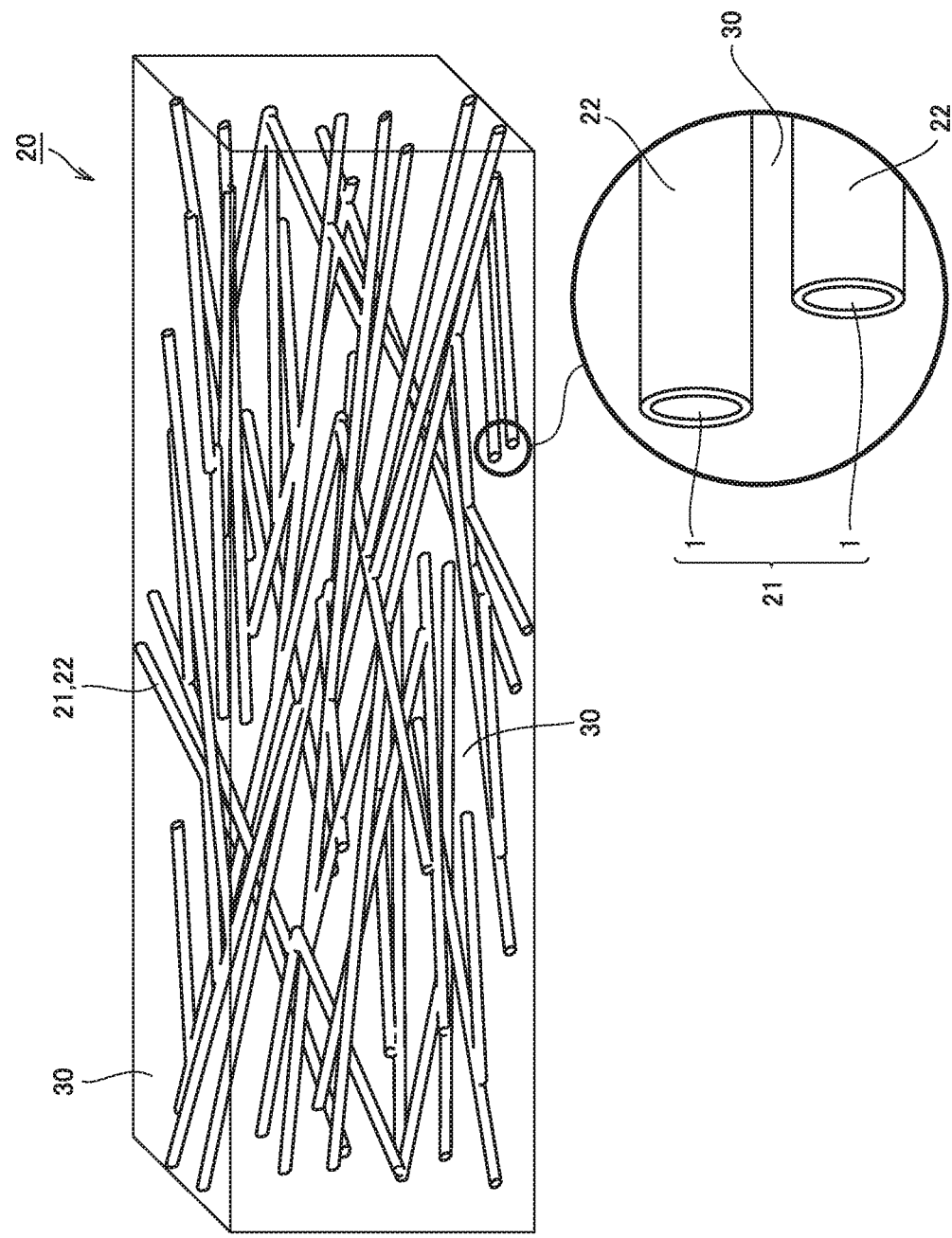
FIG. 2 is a conceptual view illustrating the structure of the negative electrode according to the present embodiment.

FIG. 2 is a conceptual view illustrating the structure of the negative electrode according to the present embodiment.

Negative electrode 20 is porous. Negative electrode 20 has a three-dimensional matrix. The three-dimensional matrix has pores 30 therein, and pores 30 are to be filled with positive electrode 10. Negative electrode 20 includes a carbon fiber aggregate 21 and a polymer film 22.

(Carbon fiber aggregate) Carbon fiber aggregate 21 consists of a plurality of carbon fibers 1 bound together in a three-dimensional fashion. The expression "(carbon fibers 1 are) bound together in a three-dimensional fashion" refers to a configuration in which carbon fibers 1 are bound together and thereby form a three-dimensional network structure. Carbon fiber aggregate 21 may have any outer profile. The outer profile of carbon fiber aggregate 21 may be sheet-like, rod-like, or spherical, for example.

Between carbon fibers 1, pores 30 are present. Carbon fiber aggregate 21 may be a nonwoven fabric composed of carbon fibers 1 and/or a felt fabric composed of carbon fibers 1, for example. The nonwoven fabric and the felt fabric can be formed into a current-collecting component with ease, which is one of the advantages of these fabrics. In a variation embodiment, carbon fiber aggregate 21 may be replaced by a porous material made of crystalline carbon. The porous material may be carbon monolith, for example. Carbon monolith can also have a three-dimensional network structure.

Carbon fibers 1 may be polyacrylonitrile(PAN)-based carbon fibers, pitch-based carbon fibers, and/or cellulose-based carbon fibers, for example. In other words, carbon fibers 1 may contain PAN-based carbon fibers. Carbon fibers 1 may substantially consist of PAN-based carbon fibers. PAN-based carbon fibers refer to carbon fibers that are produced by using PAN as raw material. Pitch-based carbon fibers refer to carbon fibers that are produced by using petroleum pitch and/or the like as raw material. Cellulose-based carbon fibers refer to carbon fibers that are produced by using viscose rayon and/or the like as raw material.

Carbon fibers 1 may be bound together by the method described below, for example. Carbon fibers 1 and a binder are mixed to prepare a mixture. The resulting mixture is heated in an inert atmosphere to graphitize (crystallize) carbon fibers 1 and the binder. In this way, carbon fibers 1 may be bound together. The binder may be coal tar pitch, phenolic resin, and/or epoxy resin, for example.

Carbon fibers 1 may have an average diameter not smaller than 1 μm and not greater than 50 μm, for example. The average diameter may be the average of the diameters of 100 or more carbon fibers 1, for example. Typically, carbon fibers 1 are short fibers. Carbon fibers 1 may have a number average fiber length not smaller than 1 mm and not greater than 50 mm, for example. The number average fiber length may be the average of the fiber lengths of 100 or more carbon fibers 1, for example.

Figure 3:
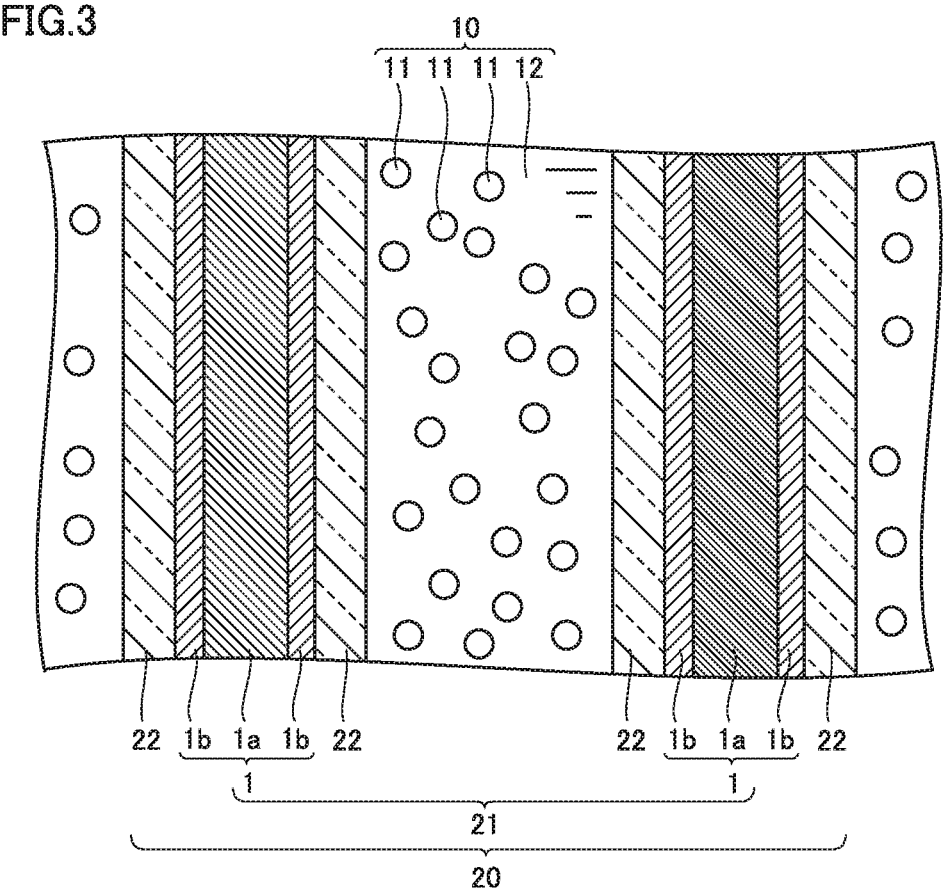
FIG. 3 is a conceptual sectional view illustrating the positions of the electrodes according to the present embodiment.

FIG. 3 is a conceptual sectional view illustrating the positions of the electrodes according to the present embodiment.

Carbon fibers 1 are made of crystalline carbon. Carbon fibers 1 serve as a negative electrode active material. On a surface of each carbon fiber 1, intercalation reaction of Li ions may occur. Each carbon fiber 1 may have a core portion 1a and a sheath portion 1b. Sheath portion 1b covers core portion 1a. The crystallinity of sheath portion 1b may be lower than the crystallinity of core portion 1a. In the configuration in which the crystallinity of sheath portion 1b of each carbon fiber 1 is low in this way, the rate of intercalation reaction that occurs on a surface of each carbon fiber 1 is expected to be increased. In such a configuration, occurrence of side reaction and the like at a high temperature is also expected to be reduced.

Sheath portion 1b may be formed by the method described below, for example. Carbon fibers to serve as core portion 1a are prepared. Core portion 1a (carbon fibers) is covered with an amorphous carbon material. Core portion 1a and the amorphous carbon material are subjected to heat treatment. By the heat treatment, the crystallinity of the amorphous carbon material is adjusted. In this way, sheath portion 1b may be formed.

The amorphous carbon material may be coal tar pitch, for example. The method of covering core portion 1a is not particularly limited. The method of covering may be chemical vapor deposition (CVD) or physical vapor deposition (PVD), for example. CVD may be thermal CVD or plasma CVD, for example. PVD may be vacuum deposition, ion plating, or sputtering, for example.

(Polymer Film)

Polymer film 22 covers a surface of each carbon fiber 1. Polymer film 22 may have a thickness not smaller than 1 μm and not greater than 50 μm, for example. Polymer film 22 separates carbon fiber 1 (negative electrode active material) from a group of particles 11 (positive electrode active material).

Polymer film 22 is swollen with electrolyte solution 12. In other words, the combination of polymer film 22 and electrolyte solution 12 forms a polymer gel. The polymer gel is considered Li-ion conductive but not electronically conductive. Therefore, it is considered that positive electrode 10 and negative electrode 20 are connected to each other by ionic conduction and, at the same time, the extent of occurrence of a short circuit (electric connection) between positive electrode 10 and negative electrode 20 is reduced.

Polymer film 22 is made of a polymer material, and the polymer material may be vinylidene difluoride-hexafluoropropylene copolymer (PVDF-HFP), polyethylene oxide (PEO), polymethyl methacrylate (PMMA), and/or polyvinyl alcohol (PVA), for example. Polymer film 22 may contain only one type of the polymer material. Polymer film 22 may contain two or more types of the polymer material. Polymer film 22 may further contain inorganic particles. The inorganic particles may be alumina particles, silica particles, and/or zirconia particles, for example. Polymer film 22 further containing the inorganic particles is expected to have an improved strength, for example. The particle size, the content, and the like of the inorganic particles may be adjusted as appropriate depending on, for example, the strength of polymer film 22.

Polymer film 22 may be formed by immersing carbon fiber aggregate 21 in a solution (polymer solution) in which the polymer material is dissolved. Polymer film 22 may be formed by electrophoretic deposition that is carried out in the polymer solution.

<<Positive Electrode>>

Positive electrode 10 is liquid. Pores 30 present within negative electrode 20 are filled with positive electrode 10 (see FIGS. 2 and 3). Positive electrode 10 includes group of particles 11 and electrolyte solution 12. Group of particles 11 is dispersed in electrolyte solution 12. In other words, positive electrode 10 is a particle dispersion (slurry). Positive electrode 10 may have a solid matter ratio not lower than 40 mass % and not higher than 60 mass %, for example. The solid matter ratio refers to the ratio of the amount of solid matter (group of particles 11) to the amount of positive electrode 10.

(Group of Particles)

Group of particles 11 contains a positive electrode active material and a conductive material. The positive electrode active material is particles into which Li ions can be intercalated. The positive electrode active material may have a D50 not lower than 1 μm and not higher than 30 μm, for example. The D50 refers to the particle size in volume-based particle size distribution at which the cumulative particle volume (accumulated from the side of small sizes) reaches 50% of the total particle volume. The D50 may be measured with a laser-diffraction particle size distribution analyzer, for example.

The positive electrode active material is not particularly limited. The positive electrode active material may be lithium cobalt oxide, lithium nickel oxide, spinel-type lithium manganese oxide, lamellar-rock-salt-type lithium manganese oxide, lithium nickel cobalt manganese oxide (such as $LiNi_{1/3}Co_{1/3}Mn_{1/3}O_2$), lithium nickel cobalt aluminate (such as $LiNi_{0.82}Co_{0.15}Al_{0.03}O_2$), and/or lithium iron phosphate, for example. Group of particles 11 may contain only one type of the positive electrode active material. Group of particles 11 may contain two or more types of the positive electrode active material.

As the conductive material, particles capable of forming an electron conduction path between particles of the positive electrode active material are used. The conductive material is not particularly limited. The conductive material may be carbon black (such as acetylene black), vapor grown carbon fibers (VGCF), carbon nanotubes (CNT), graphene flakes, and/or graphite, for example. Group of particles 11 may contain only one type of the conductive material. Group of particles 11 may contain two or more types of the conductive material. The content of the conductive material may be, for example, not lower than 1 part by mass and not higher than 20 parts by mass relative to 100 parts by mass of the positive electrode active material.

In the present embodiment, the positive electrode active material (particles) is dispersed in the electrolyte solution. Therefore, the conductive material needs to be adopted to form a long electron conduction path. A fibrous conductive material (such as VGCF and CNT) is considered suitable for use to form a long electron conduction path. In the present embodiment, any fibrous conductive material contained in positive electrode 10 is regarded as particles.

(Electrolyte Solution)

Electrolyte solution 12 contains at least a solvent and a Li salt. The solvent may be ethylene carbonate (EC), propylene carbonate (PC), butylene carbonate (BC), fluoroethylene carbonate (FEC), dimethyl carbonate (DMC), ethyl methyl carbonate (EMC), diethyl carbonate (DEC), γ-butyrolactone (GBL), δ-valerolactone, tetrahydrofuran (THF), 1,3-dioxolane (DOL), 1,4-dioxane (DX), 1,2-dimethoxyethane (DME), methyl formate (MF), methyl acetate (MA), methyl propionate (MP), and/or ionic liquid, for example. Electrolyte solution 12 may contain only one type of the solvent. Electrolyte solution 12 may contain two or more types of the solvent.

The solvent may contain an ether. In the configuration in which the solvent contains an ether, an improved volumetric energy density is expected to be obtained. The reason is considered that the negative electrode active material is carbon fibers in the present embodiment. The solvent may contain an ether in an amount not lower than 50 volume %, for example. The solvent may contain an ether in an amount not lower than 80 volume %, for example. For example, the solvent may substantially consist of an ether. For example, the solvent may contain an ether and the remainder may be made up of a carbonate ester.

The solvent may be a mixture of a cyclic ether and a chain ether. For example, the cyclic ether and the chain ether may satisfy the following relationship: "(cyclic ether):(chain ether)=1:9 to 9:1 (volume ratio)". For example, the cyclic ether and the chain ether may satisfy the following relationship: "(cyclic ether):(chain ether)=3:7 to 7:3 (volume ratio)". For example, the cyclic ether and the chain ether may satisfy the following relationship: "(cyclic ether):(chain ether)=4:6 to 6:4 (volume ratio)".

The cyclic ether may be tetrahydrofuran (THF), 2-methyltetrahydrofuran (2-MeTHF), 1,3-dioxolane (DOL), 1,3-dioxane, and/or 1,4-dioxane (DX), for example. The chain ether may be 1,2-dimethoxyethane (DME), 1,2-diethoxyethane (DEE), and/or 1,2-dibutoxyethane (DBE), for example. The solvent may contain only one type of the ether. The solvent may contain two or more types of the ether. The solvent may contain at least one selected from the group consisting of THF, 2-MeTHF, DOL, 1,3-dioxane, DX, DME, DEE, and DBE, for example.

The solvent may contain at least one selected from the group consisting of DX and DME, for example. The solvent may consist of at least one selected from the group consisting of DX and DME, for example. The solvent may substantially consist of DX and DME.

It is considered that an ether has a very high affinity for PAN-based carbon fibers. Therefore, the configuration in which the solvent contains an ether and carbon fibers 1 contain PAN-based carbon fibers is expected to have an improved volumetric energy density.

The Li salt is dissolved in the solvent. The concentration of the Li salt may be not lower than 0.5 mol/L and not higher than 5 mol/L, for example. The concentration of the Li salt may be not lower than 1 mol/L and not higher than 2 mol/L, for example. The Li salt may be $LiPF_6$, $LiBF_4$, $Li[N(FSO_2)_2]$(LiFSI), and/or $Li[N(CF_3SO_2)_2]$(LiTFSI), for example. Electrolyte solution 12 may contain only one type of the Li salt. Electrolyte solution 12 may contain two or more types of the Li salt.

The Li salt may contain a Li imide salt. For example, the Li salt may contain a Li imide salt and $LiPF_6$. For example, the Li salt may substantially consist of a Li imide salt. The Li imide salt is a salt composed of a Li ion and a fluorine-containing sulfonyl imide anion. The "fluorine-containing sulfonyl imide anion" refers to a sulfonyl imide anion containing a fluorine atom. Each of "LiFSI" and "LiTFSI" mentioned above corresponds to a Li imide salt.

For example, the Li imide salt may be represented by the following general formula:

$$Li[N(X^1SO_2)(X^2SO_2)]$$

where each of $X^1$ and $X^2$ independently represents a fluorine atom or a $C_{1-6}$ fluoroalkyl group.

The "fluoroalkyl group" refers to a functional group obtained by substituting each of a part or all of the hydrogen atoms of an alkyl group with a fluorine atom. The fluoroalkyl group may be a fluoromethyl group, a difluoromethyl group, a trifluoromethyl group, a fluoroethyl group, a difluoroethyl group, a trifluoroethyl group, and/or a pentafluoroethyl group, for example.

The Li salt may contain only one type of the Li imide salt. The Li salt may contain two or more types of the Li imide salt. The Li salt may contain at least one selected from the group consisting of LiFSI, LiTFSI, and lithium bis(pentafluoroethanesulfonyl)imide (BETI), for example.

The Li imide salt may be highly dissociable. Therefore, the configuration in which the Li salt contains the Li imide salt is expected to have a decreased resistance, for example. It should be noted that the Li imide salt corrodes a positive electrode current collector (Al foil sheet), which is a disadvantage of the Li imide salt. When the positive electrode current collector corrodes, resistance can increase. In the present embodiment, positive electrode 10 may require no Al foil sheet (positive electrode current collector). The present embodiment is therefore expected to have a great effect of reducing resistance, attributed to the Li imide salt.

The Li salt may contain LiFSI, for example. More specifically, the Li imide salt may be LiFSI. The Li salt may substantially consist of LiFSI.

The electrolyte solution may further contain various additives in addition to the solvent and the Li salt. The electrolyte solution may contain a film-forming agent, a gas generation agent (anti-overcharging additive), and a flame retardant, for example. As the film-forming agent, $Li[B(C_2O_4)_2]$(LiBOB) and/or the like is considered. As the gas generation agent, cyclohexylbenzene (CHB) and/or the like is considered. As the flame retardant, a phosphazene and/or the like is considered.

<<Correlation Between Pores, Negative Electrode Capacity Density, and Positive Electrode Capacity Density>>

When a specific correlation is satisfied in the present embodiment between pores 30 to be filled with positive electrode 10, the negative electrode capacity density, and the positive electrode capacity density, then battery capacity is expected to be increased; more specifically, volumetric energy density is expected to be further improved.

In the present embodiment, the ratio of the volume of pores 30 to the total of the volume (absolute volume) of negative electrode 20 and the volume of pores 30 is referred to as "porosity (X) (unit, %)".

The porosity (X) may satisfy a correlation defined by the following formula (I):

$$[100/\{(B/A)+1\}]-10 \leq X \leq [100/\{(B/A)+1\}] \quad (I)$$

In the formula (I) above, "A" represents the negative electrode capacity density (unit, mAh/cm³). The capacity (unit, mAh) of the negative electrode is measured using a half cell. In the half cell, a counter electrode to negative electrode 20 is the metal Li. The negative electrode capacity density is calculated by dividing the capacity of the negative electrode by the volume (absolute volume) of negative electrode 20. The negative electrode capacity density (A) may be not lower than 250 mAh/cm³, for example.

In the formula (I) above, "B" represents the positive electrode capacity density (unit, mAh/cm³). The capacity (unit, mAh) of the positive electrode is measured using a half cell. In the half cell, a counter electrode to positive electrode 10 is the metal Li. The positive electrode capacity density is calculated by dividing the capacity of the positive electrode by the volume (absolute volume) of positive electrode 10. The positive electrode capacity density (B) may be not lower than 146 mAh/cm³, for example. It is considered that positive electrode 10 having a moderately high positive electrode capacity density is likely to have a dense conductive network formed therein.

With the correlation of the formula (I) above being satisfied, the charge-discharge efficiency is expected to be improved. The reason is considered that the moderately high ratio of the capacity of the negative electrode to the capacity of the positive electrode leads to a reduction in irreversible capacity loss.

EXAMPLES

In the following, examples according to the present disclosure are described. The scope of claims is not limited to the description below.

In the examples of the present disclosure described below, an electrolyte solution in which the solvent consists of a carbonate ester is also called "ester-based electrolyte solution" and an electrolyte solution in which the solvent consists of an ether is also called "ether-based electrolyte solution".

Experiment No. 1

In an experiment No. 1, volumetric energy density was evaluated.

Example 1

1. Preparation of Negative Electrode

As carbon fiber aggregate 21, a carbon-fiber nonwoven fabric was prepared. A surface of each carbon fiber (core portion 1a) was covered with an amorphous carbon material by thermal CVD. The amorphous carbon material was coal tar pitch. After the covering process, carbon fiber aggregate 21 was subjected to heat treatment at 1000° C. Thus, the crystallinity of the amorphous carbon material was adjusted. In other words, sheath portion 1b was formed.

PVDF-HFP was dissolved in NMP, and thus a polymer solution was prepared. In the polymer solution, carbon fiber aggregate 21 was immersed. Carbon fiber aggregate 21 was taken out of the polymer solution. Carbon fiber aggregate 21 with the polymer solution adhered thereto was dried. Thus, polymer film 22 was formed on a surface of each carbon fiber 1.

In this way, negative electrode 20 was formed. The porosity (X) measured after the formation of polymer film 22 was 64.2%. The negative electrode capacity density (A) was 289 mAh/cm³.

2. Preparation of Positive Electrode

The materials described below were prepared.
Group of Particles:
Positive electrode active material: $LiNi_{1/3}Co_{1/3}Mn_{1/3}O_2$
Conductive material: acetylene black and VGCF
Electrolyte Solution (Ester-Based Electrolyte Solution):
Li salt: $LiPF_6$ (concentration, 1 mol/L)
Solvent: EC+DMC+EMC [EC:DMC:EMC=3:4:3 (volume ratio)]

55.6 parts by mass of group of particles 11 and 44.4 parts by mass of electrolyte solution 12 were mixed, and thus positive electrode 10 was prepared. Group of particles 11 consisted of 50 parts by mass of the positive electrode active material and 5.6 parts by mass of the conductive material. The positive electrode capacity density (B) was 146 mAh/cm$^3$.

In Example 1, the right side of the formula (I) above was calculated to be 66.4% and the left side of the formula (I) above was calculated to be 56.4%. The porosity (X) in Example 1 was 64.2%. These results show that Example 1 satisfied the correlation of the formula (I) above.

3. Assembly

Polymer film 22 was partially peeled off to expose a part of carbon fibers 1 in carbon fiber aggregate 21. That exposed part of carbon fibers 1 was subjected to gold (Au) deposition. Thus, a current-collecting component was formed. To the resulting current-collecting component, negative electrode terminal 92 (tab lead) was electrically connected. Negative electrode terminal 92 was made of Ni.

Casing 90 was prepared. Casing 90 was made of SUS. The volume of the internal space of casing 90 was 1.4 cm$^3$. In casing 90, negative electrode 20 was placed. Into casing 90, positive electrode 10 was poured. As a result, it is considered that pores 30 present within negative electrode 20 were filled with positive electrode 10. It is further considered that electrolyte solution 12 contained in positive electrode 10 peameated into polymer film 22 and made polymer film 22 swollen. Casing 90 was hermetically sealed. In this way, battery 100 was produced.

5. Evaluation

Casing 90 (positive electrode terminal) and negative electrode terminal 92 were connected to a charge-discharge tester. At a current of 0.2 C and at a voltage within the range from 3 to 4.2 V, several cycles of charge and discharge were carried out. At a current of 0.2 C, discharging battery 100 from its design capacity completes in 5 hours.

After the several cycles of charge and discharge, the effective capacity of battery 100 was measured. The effective capacity was 130 mAh. Therefore, the volumetric energy density was estimated at 356 Wh/L. The resistance of battery 100 was also measured.

Example 2

In Example 2, negative electrode 20 was formed so as to have a porosity (X) of 68.2%. In Example 2, the negative electrode capacity density (A) and the positive electrode capacity density (B) were adjusted so that the right side of the formula (I) above was calculated to be 73.2% and the left side of the formula (I) above was calculated to be 63.2%. These results show that Example 2 also satisfied the correlation of the formula (I) above. In Example 2, an electrolyte solution (ether-based electrolyte solution) described below was also used. Except these conditions, the same manner as in Example 1 was adopted to produce battery 100. The effective capacity was measured and the volumetric energy density was calculated in the same manner as in Example 1. The resistance was measured in the same manner as in Example 1.

Electrolyte solution (ether-based electrolyte solution):
Li salt: LiFSI (concentration, 1 mol/L)
Solvent: DX+DME [DX:DME=5:5 (volume ratio)]

Comparative Example 1

Figure 4:
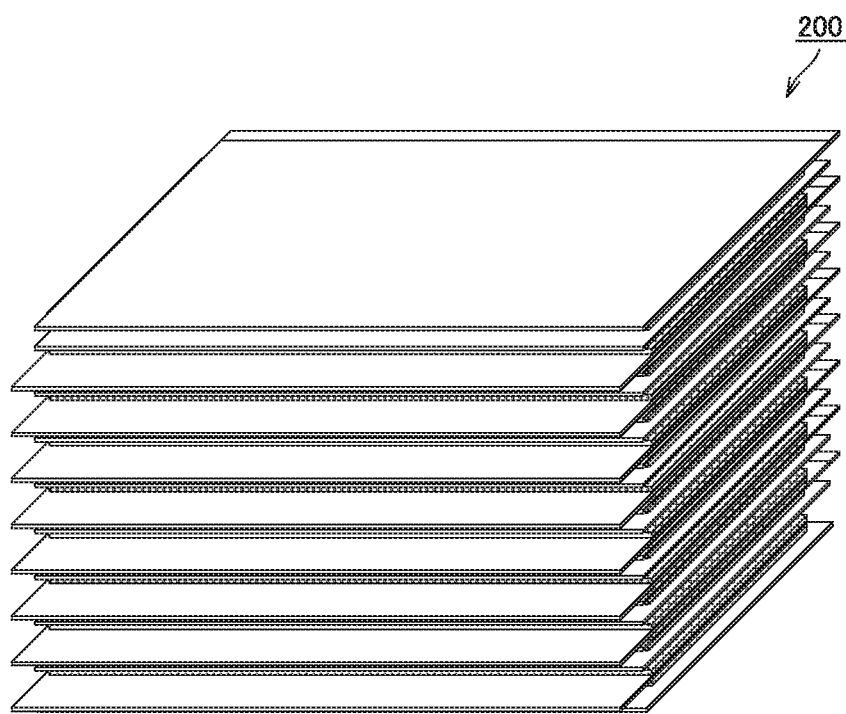
FIG. 4 is a first schematic view illustrating a stacked electrode array.

FIG. 4 is a first schematic view illustrating a stacked electrode array.

In Comparative Example 1, a laminate-type battery having a stacked electrode array 200 was produced. The laminate-type battery had a conventional electrode structure.

Figure 5:
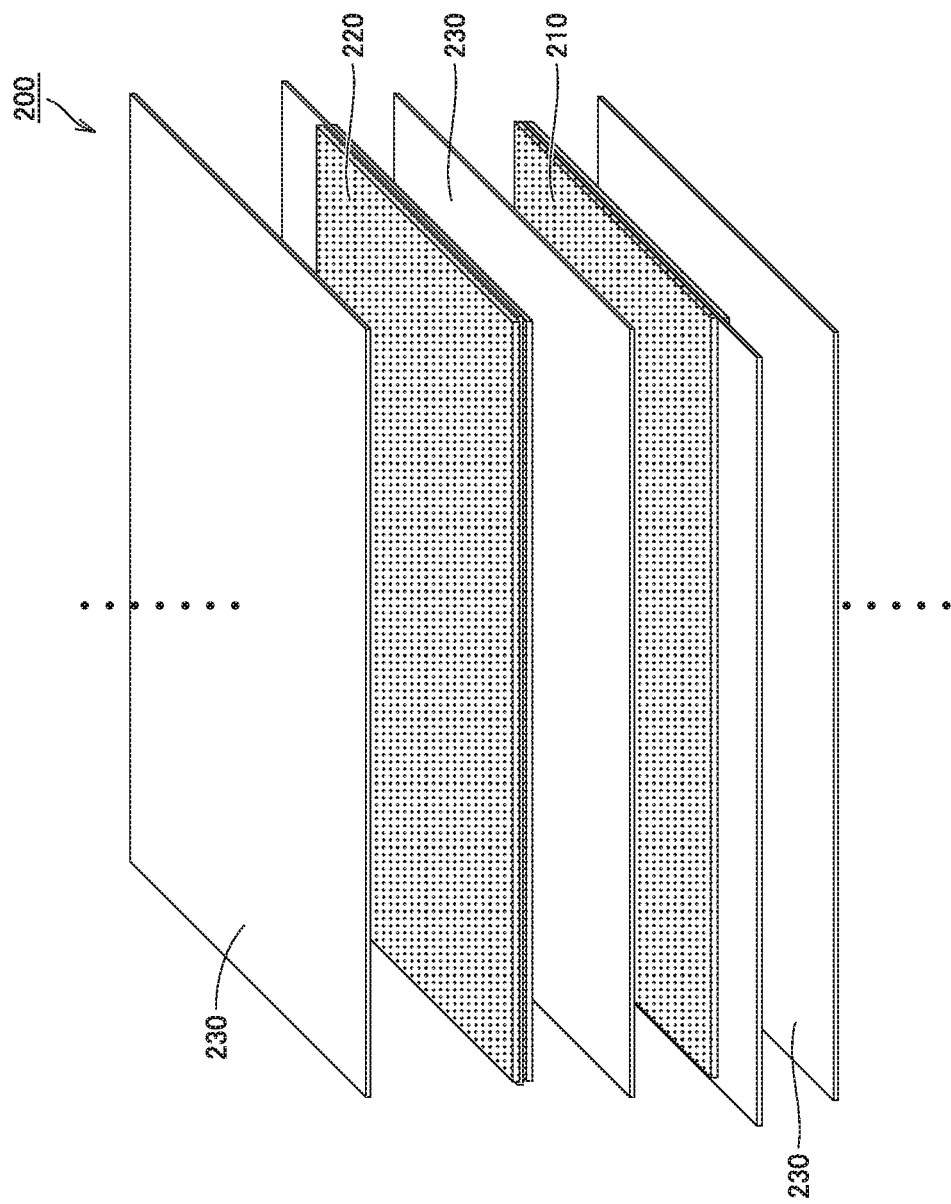
FIG. 5 is a second schematic view illustrating a stacked electrode array.

FIG. 5 is a second schematic view illustrating a stacked electrode array.

Stacked electrode array 200 was formed by alternately stacking a plate-shaped positive electrode 210 and a plate-shaped negative electrode 220. Between plate-shaped positive electrode 210 and plate-shaped negative electrode 220, a separator 230 was interposed. These components were produced by the procedures described below.

1. Preparation of Negative Electrode

The materials described below were prepared.
Negative electrode active material: spheronized natural graphite
Binder: carboxymethylcellulose (CMC) and styrene-butadiene rubber (SBR)
Solvent: water
Negative electrode current collector: copper (Cu) foil sheet Spheronized natural graphite, CMC, SBR, and water were mixed, and thus a slurry was prepared. The resulting slurry was applied to the surface (both sides) of the Cu foil sheet, followed by drying, and thus a film was formed. The resulting film had a weight per unit area (mass per unit area) of 15 mg/cm$^2$. The film was compressed. The density of the compressed film was 1.6 g/cm$^3$. In this way, a negative electrode raw sheet was produced. The resulting negative electrode raw sheet was cut into predetermined dimensions, and thus plate-shaped negative electrode 220 was produced.

2. Preparation of Positive Electrode

The materials described below were prepared.
Positive electrode active material: LiNi$_{1/3}$Co$_{1/3}$Mn$_{1/3}$O$_2$
Conductive material: acetylene black
Binder: polyvinylidene difluoride (PVDF)
Solvent: N-methyl-2-pyrrolidone (NMP)
Positive electrode current collector: Al foil sheet LiNi$_{1/3}$Co$_{1/3}$Mn$_{1/3}$O$_2$, acetylene black, PVDF, and NMP were mixed, and thus a slurry was prepared. The resulting slurry was applied to the surface (both sides) of the Al foil sheet, followed by drying, and thus a film was formed. The resulting film had a weight per unit area of 25 mg/cm$^2$. The film was compressed. The density of the compressed film was 3.2 g/cm$^3$. In this way, a positive electrode raw sheet was produced. The resulting positive electrode raw sheet was cut into predetermined dimensions, and thus plate-shaped positive electrode 210 was produced.

3. Assembly

Separator 230 was prepared. Separator 230 was a porous polyethylene film. Separator 230 had a thickness of 15 μm. Plate-shaped positive electrode 210 and plate-shaped negative electrode 220 were alternately stacked, and thus stacked electrode array 200 was formed. In each space between plate-shaped positive electrode 210 and plate-shaped negative electrode 220, separator 230 was interposed.

A pouch made of an aluminum-laminated film was prepared. In the pouch, stacked electrode array 200 was placed. Into the pouch, the ester-based electrolyte solution of Example 1 was injected. After the injection of the electrolyte solution, the pouch was hermetically sealed. In this way, a laminate-type battery was produced. The effective capacity was measured and the volumetric energy density was calculated in the same manner as in Example 1. The resistance was measured in the same manner as in Example 1.

Comparative Example 2

A laminate-type battery was produced in the same manner as in Comparative Example 1 except that the ether-based electrolyte solution of Example 2 was used. The effective capacity was measured and the volumetric energy density was calculated in the same manner as in Example 1. The resistance was measured in the same manner as in Example 1.

<<Results of Experiment>>

Table 1 below shows results of experiment No. 1. In Table 1 below, each value in the "Volumetric energy density" column is a value relative to the volumetric energy density in Comparative Example 1, which is defined as 100. In Table 1 below, each value in the "Resistance" column is a value relative to the resistance in Comparative Example 1, which is defined as 100.

thereby expands the Li-ion diffusion path to consequently lead to an increase in capacity. It is also considered that in Example 2, compared to Example 1, the porosity (X) of negative electrode 20 is high and therefore the amount of positive electrode 10 to fill the pores can be increased. This is also considered a reason for the improved volumetric energy density.

In Comparative Example 2, compared to Comparative Example 1, resistance is high. The reason is considered that the Li salt (LiFSI) corrodes the positive electrode current collector (Al foil sheet).

In Example 2, compared to Example 1, resistance is low. In Examples 1 and 2, no positive electrode current collector

TABLE 1

Results of experiment No. 1

| | Electrode structure | | | | | | Evaluation | |
| --- | --- | --- | --- | --- | --- | --- | --- | --- |
| | Negative electrode | | Positive electrode | | Electrolyte solution | | Volumetric energy density | Resistance |
| | Form/shape | Active material | Form/shape | Active material | Solvent | Li salt | | |
| Ex. 1 | Nonwoven fabric (three-dimensional network structure) | Carbon fibers | Liquid (slurry) | $LiNi_{1/3}Co_{1/3}Mn_{1/3}O_2$ | EC:DMC:EMC = 3:4:3 (ester) | $LiPF_6$ | 130 | 80 |
| Ex. 2 | Nonwoven fabric (three-dimensional network structure) | Carbon fibers | Liquid (slurry) | $LiNi_{1/3}Co_{1/3}Mn_{1/3}O_2$ | DX:DME = 5:5 (ether) | LiFSI | 140 | 40 |
| Comp. Ex. 1 | Plate | Graphite | Plate | $LiNi_{1/3}Co_{1/3}Mn_{1/3}O_2$ | EC:DMC:EMC = 3:4:3 (ester) | $LiPF_6$ | 100 | 100 |
| Comp. Ex. 2 | Plate | Graphite | Plate | $LiNi_{1/3}Co_{1/3}Mn_{1/3}O_2$ | DX:DME = 5:5 (ether) | LiFSI | 50 | 120 |

In Example 1, compared to Comparative Example 1, volumetric energy density is improved. It is considered that the electrode structure in Example 1, compared to the electrode structure in Comparative Example 1, has a high filling factor of active material.

In Example 1, compared to Comparative Example 1, resistance is low. The electrode structure in Comparative Example 1 is two-dimensional. In the two-dimensional structure, the positive electrode and the negative electrode are adjacent to each other on a single plane. More specifically, in the two-dimensional structure, plate-shaped positive electrode 210 and plate-shaped negative electrode 220 face each other (see FIG. 5). The electrode structure in Example 1 is three-dimensional (see FIG. 2). In the electrode structure in Example 1, positive electrode 10 and negative electrode 20 may be cubically adjacent to each other (see FIGS. 2 and 3). In the three-dimensional structure, compared to the two-dimensional structure, the facing area (reaction area) per unit volume is considered large. This is considered a reason for the low resistance.

In Comparative Example 2, compared to Comparative Example 1, volumetric energy density is low. It is considered that co-insertion of the ether (DX and DME) occurs in the negative electrode active material (graphite) and thereby the charge-discharge efficiency decreases.

In Example 2, compared to Example 1, volumetric energy density is improved. In both Examples 1 and 2, carbon fibers are used as the negative electrode active material. The crystallinity of carbon fibers is considered lower than that of graphite. Therefore, it is considered that co-insertion, if occurs, in carbon fibers is less likely to lead to collapse of the structure. It is also considered that co-insertion of ether moderately disrupts the regularity in the structure and (Al foil sheet) is used. Therefore, corrosion of Al foil sheet does not occur. It is considered that the highly dissociable characteristic of LiFSI decreases resistance factors (such as resistance against movement of electric charges) within the positive electrode and thereby the input-output characteristics are improved.

From the results described above, it is considered that battery 100 according to the present disclosure may have a high volumetric energy density.

Experiment No. 2

In experiment No. 2, the charge-discharge behavior was evaluated by using different combinations of a negative electrode active material and an electrolyte solution.

<<Two-Electrode Electrochemical Cell>>

A two-electrode electrochemical cell having a configuration described below was prepared.

Working electrode (WE): PAN-based carbon-fiber nonwoven fabric, pitch-based carbon-fiber nonwoven fabric, or graphite-based negative electrode Counter electrode (CE): metal Li Electrolyte solution: ester-based electrolyte solution or ether-based electrolyte solution The graphite-based negative electrode was cut out from plate-shaped negative electrode 220 in Comparative Examples 1 and 2.

The ester-based electrolyte solution was the same as the one used in Example 1 above.

The ether-based electrolyte solution was the same as the one used in Example 2 above.

<<Results of Experiment>>

The two-electrode electrochemical cell was subjected to a charge-discharge test. Results are shown in FIGS. 6 to 9.

Figure 6:
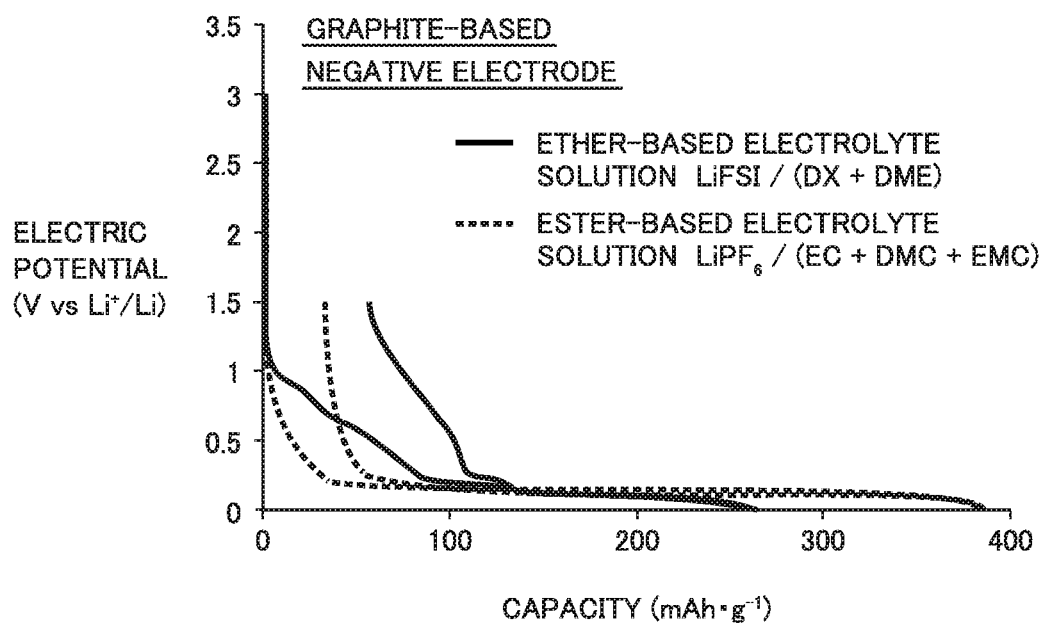
FIG. 6 is a first graph showing results of an experiment No. 2.

FIG. 6 is a first graph showing results of experiment No. 2.

FIG. 6 shows initial-charge-discharge curves obtained for the graphite-based negative electrode. A curve attributed to the ether-based electrolyte solution obtained during initial charge has a minute plateau (a portion where the graph of electric potential is flat) near 1 V vs. Li$^+$/Li. The plateau is considered attributable to co-insertion of ether. In the case of the graphite-based negative electrode, use of the ether-based electrolyte solution results in a low charge-discharge capacity compared to use of the ester-based electrolyte solution. It is considered that co-insertion of ether causes detachment of carbon hexagonal net planes from each other and subsequent collapse of the graphite crystal structure.

Figure 7:
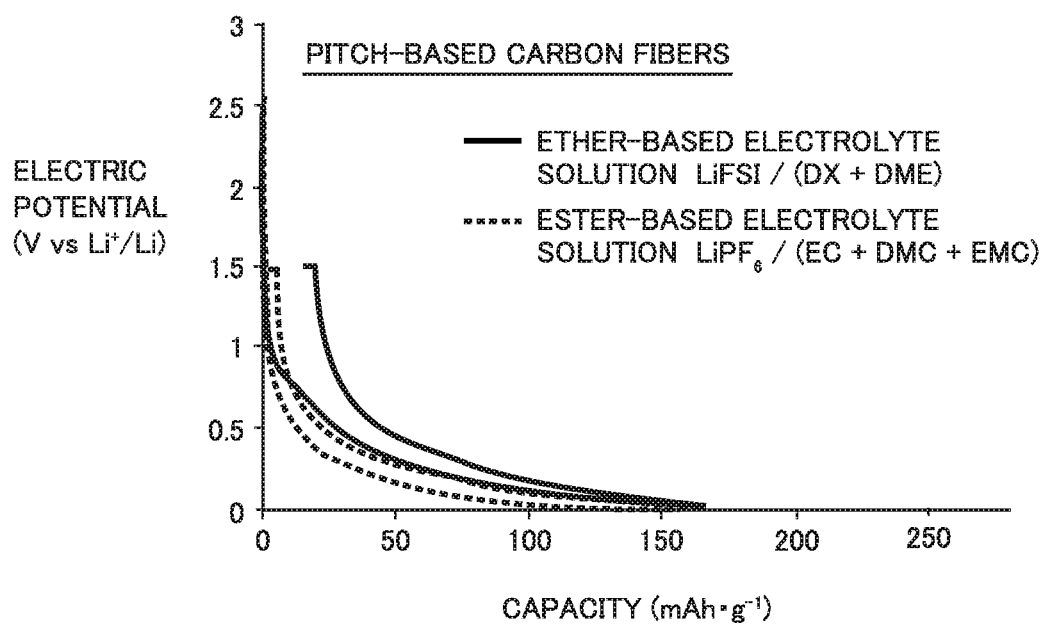
FIG. 7 is a second graph showing results of experiment No. 2.

FIG. 7 is a second graph showing results of experiment No. 2.

FIG. 7 shows initial-charge-discharge curves obtained for the pitch-based carbon-fiber nonwoven fabric. A curve attributed to the ether-based electrolyte solution obtained during initial charge has a minute plateau near 1 V vs. Li$^+$/Li. The plateau is considered attributable to co-insertion of ether. In the case of the pitch-based carbon fibers, use of the ether-based electrolyte solution results in a high charge-discharge capacity compared to use of the ester-based electrolyte solution. In addition, a decrease in polarization is also observed.

Figure 8:
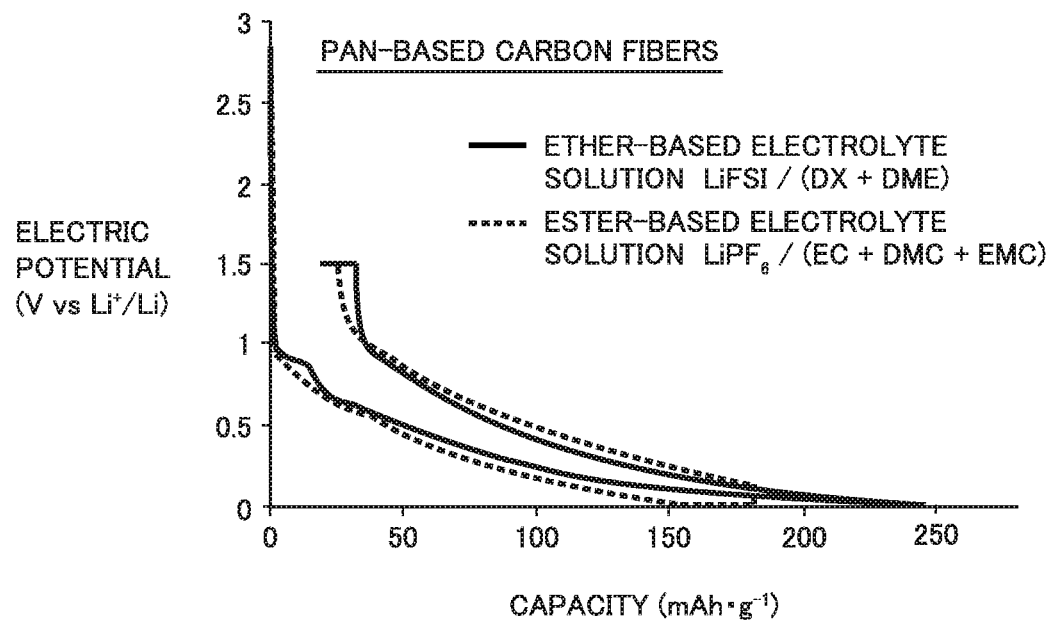
FIG. 8 is a third graph showing results of experiment No. 2.

FIG. 8 is a third graph showing results of experiment No. 2.

FIG. 8 shows initial-charge-discharge curves obtained for the PAN-based carbon-fiber nonwoven fabric. Each curve attributed to the ether-based electrolyte solution obtained during initial charge has a minute plateau near 1 V vs. Li$^+$/Li. The plateau is considered attributable to co-insertion of ether. In the case of the PAN-based carbon fibers, use of the ether-based electrolyte solution results in a high charge-discharge capacity compared to use of the ester-based electrolyte solution. In addition, a decrease in polarization is also observed.

The reason why the capacity increases when a combination of carbon fibers and the ether-based electrolyte solution is used is unclear at this point, but one potential reason is as follows: during initial charge, co-insertion of ether can moderately disrupt the regularity in the surface structure of the carbon fibers and thereby make the Li-ion diffusion path within the carbon fibers expand. This phenomenon can be responsible for the increase in capacity.

Figure 9:
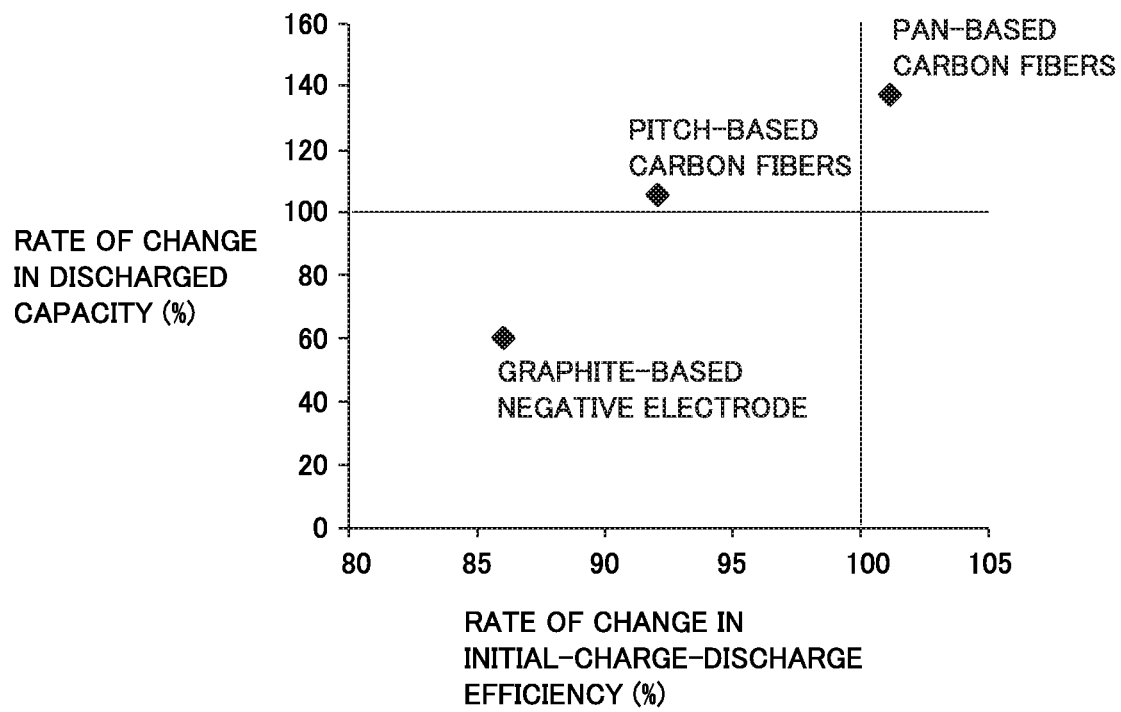
FIG. 9 is a fourth graph showing results of experiment No. 2.

FIG. 9 is a fourth graph showing results of experiment No. 2.

FIG. 9 shows the relationship between the rate of change in initial-charge-discharge efficiency and the rate of change in discharged capacity.

The "rate of change in initial-charge-discharge efficiency" is calculated by the following formula (II):

(Rate of change in initial-charge-discharge efficiency)=(initial-charge-discharge efficiency obtained with ether-based electrolyte solution)/(initial-charge-discharge efficiency obtained with ester-based electrolyte solution)×100    (II)

The "rate of change in discharged capacity" is calculated by the following formula (III):

(Rate of change in discharged capacity)=(discharged capacity obtained with ether-based electrolyte solution)/(discharged capacity obtained with ester-based electrolyte solution)×100    (III)

As shown in FIG. 9, changing the electrolyte solution from the ester-based one to the ether-based one when using PAN-based carbon fibers achieves an increase in discharged capacity without being accompanied by a decrease in initial-charge-discharge efficiency. Therefore, in the configuration of battery 100 according to the present disclosure in which a combination of PAN-based carbon fibers and the ether-based electrolyte solution is used, volumetric energy density is expected to be further improved.

The embodiments and examples disclosed herein are illustrative and non-restrictive in any respect. The technical scope indicated by the claims is intended to include any modifications within the scope and meaning equivalent to the terms of the claims.

What is claimed is:

1. A lithium-ion secondary battery, comprising at least:
a positive electrode; and
a negative electrode,
the negative electrode being porous,
the negative electrode comprising a carbon fiber aggregate and a polymer film,
the carbon fiber aggregate being an aggregate of a plurality of carbon fibers bound together in a three-dimensional fashion,
the polymer film covering a surface of each of the carbon fibers,
the positive electrode comprising a group of particles and an electrolyte solution,
the group of particles being dispersed in the electrolyte solution,
the group of particles comprising a positive electrode active material and a conductive material,
pores that are present within the negative electrode being filled with the positive electrode,
the polymer film being swollen with the electrolyte solution, wherein
the electrolyte solution comprises at least a solvent and a lithium salt, and
the solvent comprises an ether.

2. The lithium-ion secondary battery according to claim 1, wherein the solvent contains at least one selected from the group consisting of 1,4-dioxane and 1,2-dimethoxyethane.

3. The lithium-ion secondary battery according to claim 1, wherein
the lithium salt comprises a lithium imide salt, and
the lithium imide salt is a salt composed of a lithium ion and a fluorine-containing sulfonyl imide anion.

4. The lithium-ion secondary battery according to claim 3, wherein the lithium salt comprises lithium bis(fluorosulfonyl)imide.

5. The lithium-ion secondary battery according to claim 1, wherein the carbon fibers comprise polyacrylonitrile-based carbon fibers.

* * * * *